Patented Feb. 13, 1940

2,190,033

UNITED STATES PATENT OFFICE 2,190,033

MANUFACTURE OF WOOD TAR-FORMALDEHYDE RESINS

Jean J. Lévesque, Bagotville, Quebec, Canada

No Drawing. Application August 23, 1937, Serial No. 160,449

6 Claims. (Cl. 260—67)

The present invention relates to the manufacture of prepared resins and more particularly resins formed from wood tars.

Wood tars obtained in the destructive distillation of wood have, heretofore, been of comparatively little commercial value. While the tars of soft and resinous woods have been utilized to some extent as black paint bases, in ship building, pharmacy and the like, there is little use or demand for tar obtained as a by-product in the destructive distillation of hard woods and such tar is frequently discarded as a waste product. Consequently, such material is obtainable very cheaply.

An object of the present invention is the production of highly valuable resins from the relatively cheap tars obtained in destructive distillation of wood.

Another object of the invention is the production of relatively high yields of valuable synthetic resins from wood tars and particularly tar produced in the destructive distillation of hard wood.

A further object of the invention is the production of synthetic resin from wood tars in which the pitch oils are utilized with or without the light and creosote oils.

Still another object of the invention is the production of resin from wood tar by obtaining a high yield of distillation products from the tar and reacting the distillate thus obtained with a resinifying body and a catalytic agent to produce substantially insoluble, infusible and moldable substances.

Other objects and advantages of the invention will become apparent as the description progresses.

The process generally consists in subjecting wood tar to distillation under relatively high conditions of temperature, preferably under vacuum, to obtain a high yield of oils, including not only the light and heavy or creosote oils, but the higher boiling pitch oils which form a relatively large proportion of the tar. The oils thus obtained are reacted with a resinifying body, such as formaldehyde or other methylene containing body, and with agents which act catalytically in resin forming reactions to produce a highly valuable resin. The process is applicable to soft and resinous wood tars and is particularly adaptable for the production of resin from settled hard wood tars which is a very cheaply obtainable by-product in the destructive distillation of hard wood.

I have obtained very satisfactory results by subjecting the tar obtained in destructive distillation of hard wood to distillation at heating temperatures up to 350° C. conducted under a high vacuum. The distillation was conducted in three stages comprising an initial operation resulting in the distillation of a light oil fraction distilling at a temperature of approximately 80° C. to 180° C., which was conducted under atmospheric pressure and producing what is known as a light oil fraction of the tar.

A second stage of distillation produced a second fraction distilling at a temperature of approximately 180° C. to 260° C., also at atmospheric pressure, and producing a fraction known as heavy or creosote oil.

The distillation operation was then continued in a third stage at a temperature up to 350° C., under a high vacuum, preferably a vacuum exceeding twenty-five inches, producing a relatively large yield of the heavier oil, known as pitch oil, distilling from the tar at a temperature of approximately 110° to 350° C.

By this treatment, I obtained a relatively high yield of oils suitable for the manufacture of resin. The comparatively high oil yield obtained from the tar body was due, to a great extent, to the important step of distilling the pitch oil which constituted a yield of approximately 35% of the tar, compared to approximately 10% of light oil and 20% of creosote or heavy oil.

Although the entire oil distillate obtained from the distillation operation may be treated together in the resin producing operation, I prefer to treat each of the three fractions separately to obtain resins of correspondingly distinctive character.

Inasmuch as the treatment of the three distillation fractions is basically similar, the description of the treatment of the pitch oil will serve to describe the essential treatment of all of the fractions.

The pitch oils distilling at a temperature up to approximately 350° C., under vacuum, were initially washed in a sodium carbonate solution for bleaching and neutralizing purposes. The water was removed by decanting or siphoning, and the remaining oil was mixed with formaldehyde, a commercial 40% solution, in the proportion of about equal parts of pitch oil and 40% formaldehyde solution, by weight. A small amount, approximately 1% by weight, of sodium hydroxide, sodium carbonate, potassium hydroxide or potassium carbonate, and the same amount of aniline, were added to the mixture which was then violently agitated, as for instance by an electric stirrer, and heated to a temperature of approximately 100° C., that is, just below the boiling point of the water, for about one hour.

Reaction was generally finished after that period of time, and checked by the appearance and characteristics of the treated mixture. It was found that said mixture, after the heating and agitation were suspended, settles into three definite layers, as follows:

Bottom layer: synthetic resin.
Intermediate layer: water and formaldehyde.
Top layer: unreacted oils with small amounts of resin dissolved therein.

Thus, the unreacted oils floating could be easily discerned, abnormal amounts thereof being indicative of an incomplete reaction.

The mixture was allowed to cool and the watery liquid removed. The residue was first washed with water and then with gasoline and the resulting product was dehydrated in vacuum (28 inches) at a temperature between 120 and 130° C., for one-half to two hours, producing a hard brown coloured solid material. This resinous product is useful for many purposes; it may be ground and mixed with fillers and hardeners, for molding purposes, or dissolved in suitable solvents. While the product is insoluble in water, benzene or solvent naphtha, it is soluble in acetone, and a mixture thereof with alcohol, for use in paints, varnishes and the like after bleaching with suitable bleachers.

Furthermore, this resinous product may be subjected to further hardening, when it is intended to be used for hard molded articles. It is then subjected to a hardening treatment for a few minutes at a temperature ranging between 115 to 120° C.; it is then immediately molded under high pressure in hot molds (120-130° C.) and left therein for a few minutes. On being removed from the molds, the articles are then finally hardened, or cured, in an autoclave, at pressures between 10-35 lbs. per sq. inch and at temperatures of 130 to 140° C. for one-half to one hour. The resulting molded article is a strong, dielectric and infusible machinable product, very substantially unaffected by water, acids, alkalies and ordinary solvents including benzene, solvent naphtha, acetone and alcohol.

Although, in the example described, I have indicated and prefer to use aniline and caustic soda as the catalytic agent, other agents, as for instance caustic potash, potassium carbonate and in general all alkali carbonates as well as mineral acids, such as sulphuric and hydrochloric acids, may be used as a catalyst, although less effectively. I have found, however, that aniline and sodium carbonate is the best catalyst for my purpose: with its use, the yield is the highest I have obtained so far, as indicated by the very small quantity of unreacted oils floating on top of the mixture, as previously explained. Furthermore, the resin produced appears harder and the reaction time is shorter. The amount of catalytic agent used may vary, as for instance, from .1% to 5%, in accordance with the reaction desired.

In consequence of such treatment, I obtain not only a comparatively high yield of distillation products, due to the relatively high temperature and vacuum, which enables the distillation of the pitch oil from the tar, but I obtain an exceptionally high yield of resin from the distillates by the particular reaction effected.

It is to be understood that the form of my invention herein described is to be taken as a preferred example of the same, and that various changes as to the proportion of ingredients and steps of the process may be resorted to without departing from the spirit of the invention or the scope of the subjoined claims.

Having thus described my invention, I claim:

1. A process for producing synthetic resin which comprises subjecting wood tar under conditions of temperature reaching between 110° to 350° C. and in a vacuum sufficient to distil pitch oils therefrom at the stated temperatures, and reacting the said distillate with formaldehyde and with aniline and potassium carbonate.

2. A process for producing synthetic resin which comprises subjecting wood tar to distillation to a temperature of about 350° C. under high vacuum to distil pitch oil therefrom, and reacting the said distillate with formaldehyde and with a catalytic agent.

3. A process for producing synthetic resin which comprises subjecting wood tar to distillation to a temperature of about 350° C. under high vacuum to distil pitch oil therefrom, and reacting the distillate with an approximately equal part of formaldehyde and with aniline and sodium carbonate as a catalytic agent.

4. A resinous material comprising a product of wood tar produced by the distillation of the tar in a high vacuum substantially between 110° C. and 350° C. reacted with formaldehyde and a catalytic agent.

5. A resinous material comprising a product of wood tar produced by the distillation of the tar to a temperature of approximately 350° C. under high vacuum, and reacting the resultant pitch oils with formaldehyde and a small amount of an agent which acts catalytically in resin forming reactions.

6. A resinous material comprising a product produced by the distillation of settled wood tar distilled at a temperature attaining approximately 350° C. in a high vacuum reacted with formaldehyde and aniline and sodium carbonate.

JEAN J. LÉVESQUE.